(12) United States Patent
Kappla et al.

(10) Patent No.: US 8,556,646 B2
(45) Date of Patent: Oct. 15, 2013

(54) PLUG ELEMENT HAVING A LOCKING MECHANISM

(75) Inventors: Olaf Kappla, Munich (DE); Norbert Niesemeyer, Coburg (DE); Marco Steinbrueck, Grasbrunn (DE)

(73) Assignee: Leoni Kabel Holding GmbH, Nuremberg (DE)

( * ) Notice: Subject to any disclaimer, the term of this patent is extended or adjusted under 35 U.S.C. 154(b) by 0 days.

(21) Appl. No.: 13/555,588

(22) Filed: Jul. 23, 2012

(65) Prior Publication Data

US 2013/0183846 A1    Jul. 18, 2013

Related U.S. Application Data

(63) Continuation of application No. PCT/EP2011/000215, filed on Jan. 20, 2011.

(30) Foreign Application Priority Data

Jan. 22, 2010   (DE) .......................... 10 2010 005 377

(51) Int. Cl.
 *H01R 13/62* (2006.01)
(52) U.S. Cl.
 USPC ........................................................ 439/352
(58) Field of Classification Search
 USPC ........................................................ 439/352
 See application file for complete search history.

(56) References Cited

U.S. PATENT DOCUMENTS

| | | | |
|---|---|---|---|
| 6,648,665 B1 | 11/2003 | Wu | |
| 6,702,603 B2 * | 3/2004 | Wu | 439/352 |
| 7,008,253 B2 | 3/2006 | Szczesny | |
| 7,204,712 B2 * | 4/2007 | Schwiebert et al. | 439/352 |
| 7,416,433 B1 | 8/2008 | Wu | |
| 7,422,457 B1 | 9/2008 | Wu | |
| 7,445,484 B2 * | 11/2008 | Wu | 439/352 |
| 7,666,023 B2 * | 2/2010 | Wu | 439/352 |
| 7,753,710 B2 * | 7/2010 | George | 439/352 |
| 2005/0208821 A1 | 9/2005 | Ishigami et al. | |
| 2006/0014408 A1 | 1/2006 | Guan et al. | |
| 2006/0258201 A1 | 11/2006 | Schwiebert et al. | |
| 2009/0209125 A1 | 8/2009 | Bright et al. | |
| 2009/0291584 A1 | 11/2009 | Wu | |

OTHER PUBLICATIONS

International Search Report of PCT/EP2011/000215.

\* cited by examiner

*Primary Examiner* — Gary F. Paumen
(74) *Attorney, Agent, or Firm* — Laurence A. Greenberg; Werner H. Stemer; Ralph E. Locher (57) ABSTRACT

A plug element, in particular a QSFP plug element is configured for a lockable plug connection with a counter piece. The plug element contains a plug housing that extends in the longitudinal direction. In the housing an actuating element that is displaceabley mounted in the longitudinal direction being provided for unlocking. For locking, a wall section of the plug housing latches to a wall section of the counter piece in the plugged state. A flexible locking flap engages behind an edge of a recess. The recess is formed in a side wall of the plug housing and the locking flap is configured in a side wall of the counter piece. Unlocking is carried out by a displacement of the actuating element in the longitudinal direction, the element contains an unlocking element that pushes the locking flap perpendicularly to the longitudinal direction in the transverse direction out of the locking position.

18 Claims, 6 Drawing Sheets

PLUG ELEMENT HAVING A LOCKING MECHANISM

CROSS-REFERENCE TO RELATED APPLICATION

This application is a continuation, under 35 U.S.C. §120, of copending international application No. PCT/EP2011/000215, filed Jan. 20, 2011, which designated the United States; this application also claims the priority, under 35 U.S.C. §119, of German patent application No. DE 10 2010 005 377.5, filed Jan. 22, 2010; the prior applications are herewith incorporated by reference in their entirety.

BACKGROUND OF THE INVENTION

Field of the Invention

The invention relates to a plug element having a locking mechanism for forming a lockable plug connection with a counter piece, in particular a so-called QSFP plug element, containing a plug housing, which extends in the longitudinal direction, and an actuating element, which is mounted displaceably in the longitudinal direction, for unlocking.

The plug element is formed in particular as a so-called quad small form-factor plugable (QSFP), as is specified for example in "SFF-8436 Specification for QSFP+COPPER AND OPTICAL MODULES". The plug element is therefore formed in particular as a flat plug, usually with a rectangular cross section and small structural height. Such plug elements serve for forming small-sized, flat plug connections, in particular for data or signal lines with a high data transmission rate in networks. They are used for the electrical and/or optical connection of the data line to electrical or electro-optical devices. They preferably serve thereby for the connection of the data line to a printed circuit board. The printed circuit board usually has here a counter piece, particularly formed as a mating plug element, into which the plug element can be inserted to form the plug connection. A form that is as small as possible is aimed for here, in order for example to arrange a number of such plug connections alongside one another in a limited space. Such plug connections are usually secured against unintentional disconnection by a manually releasable locking mechanism. On account of the small form that is aimed for, the locking mechanism must be integrated in the plug element in an extremely small space. At the same time, a high level of sustained functional reliability must be ensured, along with a low-cost configuration.

Examples of plug elements for flat plugs can be taken from U.S. Pat. No. 7,008,253 B2 or U.S. Pat. No. 6,648,665 B1. The plug elements described therein have an actuating element formed as a pull tab, which is given the form of a fork and the fork arms of which are guided within the plug housing. Each fork arm is assigned a locking element, which respectively has a latch, which engages in a corresponding recess in the housing of the counter piece. For unlocking, the latch is brought out of the locking position by a relative movement between the locking element and the actuating element. In the case of U.S. Pat. No. 6,648,665 B1, this takes place by a turning movement of the locking elements about a vertical axis; in the case of U.S. Pat. No. 7,008,253 B2, the locking elements formed in the manner of spring tongues are displaced outwardly when there is a displacement of the actuating element. The locking elements are respectively separate components, which are likewise fitted in the housing. As a result, altogether a complex structure is required.

SUMMARY OF THE INVENTION

The invention is based on the object of providing a plug element having a locking mechanism which can be produced at low cost and is manually releasable, with a high level of functional reliability.

The object is achieved according to the invention by a plug element. The plug element is in this case formed in particular as a flat plug, usually with a rectangular cross section and low structural height. The plug element is, in particular, a so-called SFP plug (small form factor plugable), in particular a so-called QSFP plug. The plug element serves for forming a lockable plug connection with a counter piece. For this purpose, the latter usually has a preferably likewise rectangular housing, into which the plug element is inserted. The plug element has a plug housing, which extends in the longitudinal direction, and an actuating element, which lies in the longitudinal direction, in particular protected within the plug housing, is displaceably mounted and is displaced manually in the longitudinal direction for unlocking. For locking, provided directly between the two housings are a pair of latching elements, to be specific on the one hand an elastic/flexible locking tab and on the other hand a clearance in a respective wall section of the plug housing and of the counter piece. The plug housing preferably has the clearance and the counter piece preferably has the locking tab. The pairs of latching elements are thereby particularly formed respectively on opposite side walls of the housings. The locking tab is in this case part of the side wall and, by punching out, particularly in a U-shaped form, being performed in partial regions of the side wall, is separated from it and bent inwardly in the transverse direction toward the plug housing. It is therefore formed in the manner of a spring tab. In the plugged state, the locking tab snaps into the clearance in the plug housing and engages behind an edge formed by the clearance, so that a form locking is formed in the longitudinal direction. This prevents the plug element from being pulled out from the counter piece. In particular, in the locked state the locking tab butts with its end side against the edge.

The actuating element has an unlocking element, which presses the locking tab out of the clearance in the transverse direction, and consequently out of the locking position, when the actuating element is reset.

In the case of this configuration, it is therefore provided that the locking is formed directly between the housings of the plug element on the one hand and of the counter piece on the other hand, and therefore no additional locking elements that have to be displaced in the transverse direction are required. As a result, a simplified structure is achieved overall.

Locking pairs are expediently provided here on opposite side walls, i.e. the plug housing respectively has on opposite wall sections a clearance formed in particular as an aperture. The actuating element is at the same time preferably formed as a fork with two fork arms, at the ends of which an unlocking element is respectively provided.

In this case, a respective fork arm is preferably guided in a guide within the housing, which is formed by the side wall and a guiding wall running parallel thereto. In the wall region, the plug housing is therefore of a double-walled form to form the guide.

In an expedient configuration, the unlocking element has on an outer side a locking release with an area which runs obliquely in relation to the longitudinal axis and, when the actuating element is displaced, interacts with the locking tab and presses it outwardly in the transverse direction for unlocking. In a basic position, which corresponds to the locking position, the locking release is therefore positioned in front of the locking tab—considered in the longitudinal direction—so that, when the actuating element is pulled in the rearward direction, the locking release presses the locking tab outwardly. There is therefore a linear relative displacement of the locking release with respect to the locking tab. Seen in cross section, the locking release is configured, for example, in the form of a wedge with an area running straight or else in the form of an arc, which interacts with the tab. During actuation, the locking tab is therefore pressed successively further out.

In a preferred development, it is provided that the clearance has in the longitudinal direction a continuation in which the locking release lies in the basic position. The continuation is in this case realized so as to form a step, the continuation preferably being arranged centrally. Stepped edges thereby form the edge which is engaged behind by the locking tab in the locked state.

The locking release lies with its flat outer side against the inner side of the side wall of the plug housing and the locking release protrudes out from the outer side, considered in the transverse direction, and engages in the continuation. The locking release preferably extends in the transverse direction over a height which corresponds to, or is somewhat less than, the thickness of the wall of the side wall of the plug housing.

In order to hold the actuating element, and in particular the unlocking element with the locking release, in the basic position and return it again, preferably automatically, into the basic position after actuation, in a preferred development a correspondingly acting spring element is provided. This exerts a spring force on the actuating element in the direction of the longitudinal direction. Upon actuation, that is to say drawing back, of the actuating element, it must be actuated against the spring force. The spring force is in this case dimensioned such that the resetting into the basic position preferably takes place automatically by the spring force alone.

The spring element is expediently formed here on the unlocking element or alternatively on the actuating element itself. Therefore, no additional component is required. The spring element is in this case formed as a spring tab or spring lug integrally formed on the unlocking element or on the actuating element. The spring tab expediently engages in an abutment formed on the plug housing, is therefore held immovably there during a displacement, so that a displacement of the actuating element leads to a bending of the spring tab. The spring tab is preferably already prestressed in the basic position, in order to hold the actuating element reliably in the basic position. In a preferred configuration, the spring tab thereby extends in the vertical direction, that is to say perpendicularly in relation to the longitudinal direction and perpendicularly in relation to the transverse direction. The spring tab is therefore offset by 90° in relation to the locking release.

Altogether, the unlocking element is preferably formed as a narrow, plate-shaped element with two opposite flat sides, which are connected to two end sides extending horizontally in the transverse direction. The locking release protrudes from one of the flat sides. The plate-shaped basic element also preferably has a recess, from the base of which the spring tab extends in the vertical direction and projects beyond one of the end sides. Alternatively, the actuating element preferably has a recess, from the base of which the spring tab extends in the vertical direction and projects beyond one of the end sides.

According to a preferred configuration, at least in certain partial regions the unlocking element is led from the inside of the plug housing to the outside and runs along an outer wall. In particular, it is provided here that this is a separate unlocking element, in particular in the form of a spring-elastic sheet-metal part. This is preferably connected to the actuating element guided inside the plug housing by a positive connection, for example a plug connection.

The particular advantage of this variant of the embodiment can be seen in that the unlocking element does not take up any space in the interior of the plug housing, and consequently the interior is increased in size—in comparison with a variant of the embodiment with an unlocking element on the inside.

Here, the unlocking element preferably finishes flush with the further side wall parts of the plug housing. At its front end, the unlocking element has the locking release. In the case of this variant of the embodiment, the spring element is expediently formed on the actuating element inside the interior of the housing.

According to an expedient configuration, the unlocking element is formed overall as a one-piece plastic component, in particular a plastic injection-molded part. The entire actuating element is preferably formed from plastic. The unlocking element is, in particular, a separate component, which is attached to a basic part of the actuating element, preferably by latching engagement. As an alternative to this, the entire actuating element is formed as a one-piece plastic part, it expediently being provided here that different plastics are used for different functional zones, for example in a multi-component injection-molding process. Particularly for the unlocking element, a plastic that is different from the basic part is used. Alternatively, the unlocking element is formed as a metal part.

Following a principle of like parts, if the unlocking elements are configured separately, they are preferably formed identically and arranged at the fork ends with them turned by 180° in relation to one another. This has the effect that the spring tab in the case of one unlocking element engages downwardly and the spring tab of the other unlocking element engages upwardly in a respective abutment. There is therefore no need to provide different forms of mold for two different unlocking elements. Following a principle of like parts, alternatively, if the spring tabs are integrated on the actuating element, the unlocking elements are likewise formed identically and arranged at the fork ends with them turned by 180° in relation to one another. Assembly is also easy. To make this possible, the plug housing is also correspondingly formed, and therefore has two opposite abutments for each fork arm. These abutments are formed in particular in the manner of simple recesses in the bottom side and top side of the plug housing.

The actuating element generally has a grip part, which can be actuated from outside the plug housing and is adjoined by the fork arms. The actuating element is inserted into the plug element in the longitudinal direction from the rear side of the element that is facing away from the counter piece. The required cable is likewise inserted at the rear side of the plug element. To make it possible to have the greatest flexibility with regard to the arrangement of the grip part, it is provided in an approximately L-shaped leg or connecting angle, with which the grip part lies against the rear side in the basic position. The connecting angle thereby extends in the vertical direction and preferably over the height of the plug housing, so that the grip part is arranged above the centrally inserted cable. Here, the grip part is preferably in line with the flat side of the plug housing. Furthermore, the configuration is preferably chosen such that the entire actuating element can optionally be turned by 180°, so that, according to requirements, the grip part may be arranged on both sides.

This last-mentioned aspect of making the optional arrangement possible is regarded as an independent inventive aspect, independent of the direct latching engagement between the housing parts.

In order to make this optional arrangement possible, it is provided in particular that the fork arms extending into the plug housing adjoin the L leg centrally. In other words, they extend symmetrically along a center line, so that they are formed symmetrically about the longitudinal direction with respect to a 180° turn. It is correspondingly also provided that the guide formed in the plug housing is formed symmetrically about the longitudinal direction in respect of such a 180° turn.

It is expediently provided with regard to the plug housing that it is separated into two plug housing halves, which are separated in particular along a center plane of the plug housing. In this case, a guiding channel part is provided in each plug housing part, one channel part complementing the other to form the guide for the actuating element. The guiding channel parts are in this case symmetrically formed and in each case have the already mentioned abutment, in particular in the form of a recess.

Generally, an electrical contact connection is established by such a plug connector. This is not described any more specifically here, since it is known per se and defined in standards and specifications. Generally, the plug element has an inner printed circuit board (PCB board), which is in electrical contact with the lines of the data cable. It is fixed to the housing, preferably either by a latching engagement or by so-called overmolding.

Other features which are considered as characteristic for the invention are set forth in the appended claims.

Although the invention is illustrated and described herein as embodied in a plug element having a locking mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4B is a perspective view of the actuating element represented in

FIG. 4A with two unlocking elements assembled at the ends of fork arms;

FIG. 7A is a sectional view through the plug housing corresponding to

FIG. 6A in the unlocked position;

DETAILED DESCRIPTION OF THE INVENTION

In the figures, parts that act in the same way are provided with the same designations. Furthermore, the required electrical contact elements and printed circuit board elements, etc., have not generally been represented in the figures for reasons of overall clarity.

The plug element 2 represented in the figures is formed as a flat plug with a rectangular cross section, in particular as a so-called QSFP plug, which is intended in particular for data or signal lines with a high data transmission rate (electrical or optical) in networks. The plug element 2 serves for inserting into a counter piece 4, which is formed as a mating plug element and is usually attached directly on a printed circuit board 6. The plug element 2 is generally a so-called SFP plug element (small-form-factor-plugable), the width of which typically lies in the range of a few cm, for example in the range of 2 to 3 cm. Its height or thickness lies below that, and for example in the range of 1.5 to 2 cm. The overall length of the plug element 2 (housing without projecting grip part or pull tab) is for example between 6 and 10 cm. The plug element 2 serves for inserting into the counter piece 4 to form a plug connection. The plug element 2 can in this case be locked with the counter piece 4, in order to avoid unintentional disconnection of the plug connection.

The plug element 2 has a plug housing 10 with a lower housing part 10A and an upper housing part 10B, which are releasably connected to one another along a center plane. The housing 10 has a rear region 12A and a front insert region 12B, which is stepped toward the rear region 12A to form a step. The insert region 12B is inserted into the counter piece 4 up to the step to form the plug connection. A line, in particular a data line 14, is inserted into the plug housing 10 at a rear side thereof and, in a way not represented any more specifically, inside is in electrical contact with a printed circuit board element in particular. From the rear side, an actuating element 16 is inserted into the plug housing 10. This serves for releasing a locking that is formed in the plugged state between the plug housing 10 and the counter piece 4.

For the locking in the plugged state, a pair of latching elements are respectively formed on side walls 18A, 18B of the plug housing 10 and of the housing of the counter piece 4. For this purpose, in the side wall 18A of the plug housing 10 there is formed a clearance 20, formed in particular as an aperture, and on the side wall 18B of the counter piece 4 there is formed a locking tab 22 in the manner of a spring tab. The locking tab 22 is achieved by punching free a partial region of the side wall 18B, the locking tab 22 being bent inwardly, seen in a transverse direction 24. During the inserting operation, the locking tab 22 is initially pressed outwardly in the transverse direction from the side wall 18A, until a basic or end position is reached and the locking tab 22 snaps into the clearance 20 and engages behind an edge 26 of the clearance 20, that is to say forms a form-locking engagement that is effective in the longitudinal direction 8. As a result, pulling of the plug element 2 in the rearward direction is no longer possible, as long as the locking exists.

For the unlocking, an unlocking mechanism is provided, explained more specifically below. A main element of the unlocking mechanism here is the actuating element 16, which is guided within the plug housing 10 in a channel-like guide 28. The guide 28 is in this case formed by a respective side wall 18A and an inner wall 30, running parallel thereto, of the plug housing 10.

In the exemplary embodiment, the actuating element is formed as a fork. Provided in the partial region thereof at the rear is a grip part 32, which is formed as a gripping tab and has toward the plug housing 10 a kind of L leg 34, with which it is supported in a basic position on the rear side of the plug housing 10 or lies against it there. Approximately in the middle of the L-shaped leg 34 there respectively adjoins a fork arm 36, at the front end side of which an unlocking element 38 is respectively attached by a latching connection. The grip part 32 forms with the fork arms 36 a basic part, to which the unlocking elements 38 are attached. The entire actuating element 16 is preferably formed as a plastic part. Different types of plastic may be provided here for the basic part and the locking elements 38. As a difference from this, the plug housing 10 is usually made of metal. Alternatively, the unlocking element may also be made of metal.

Figure 3:
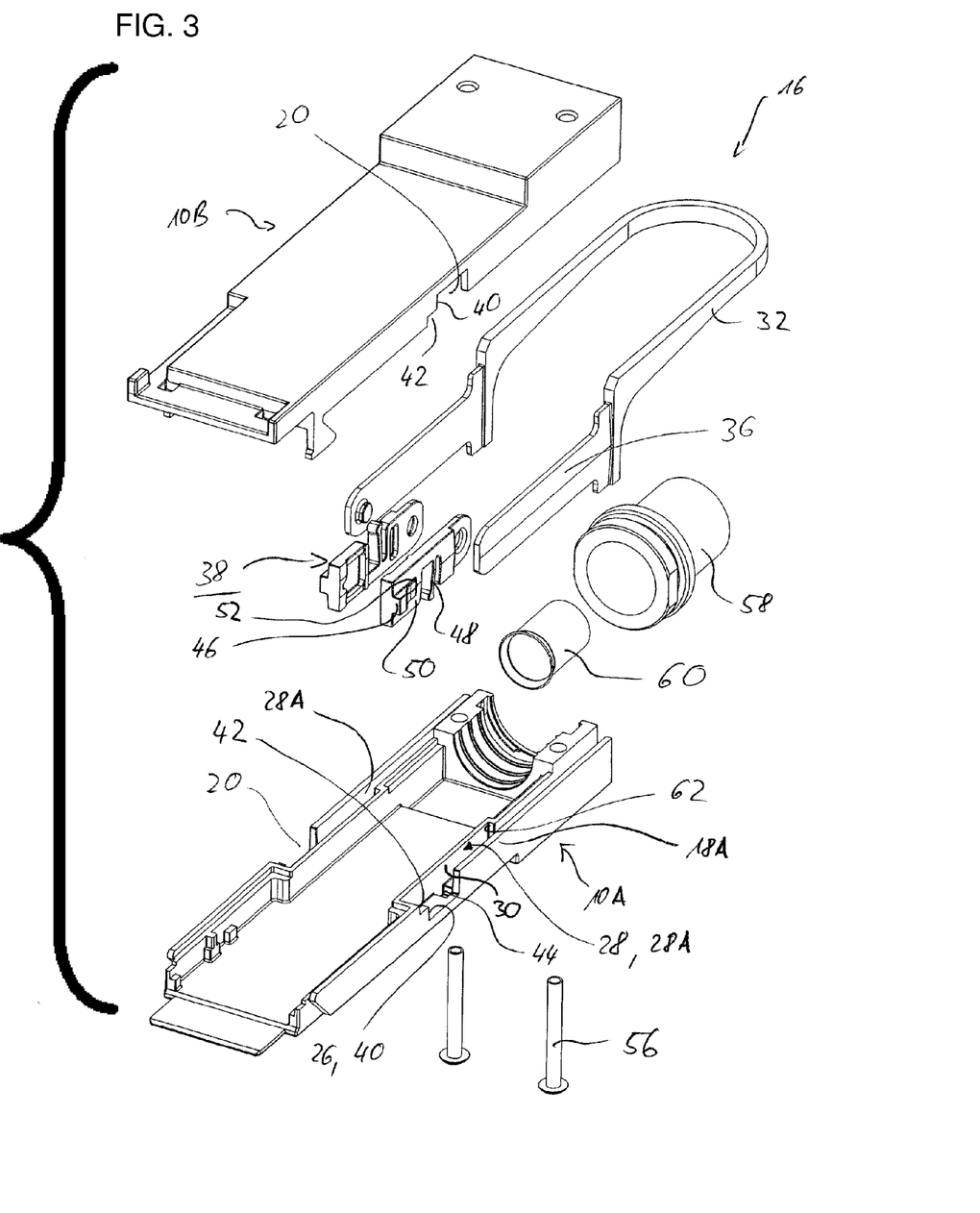
FIG. 3 is an exploded, perspective view of some components of the plug element, which are in particular relevant for the unlocking mechanism.
Figure 4A:
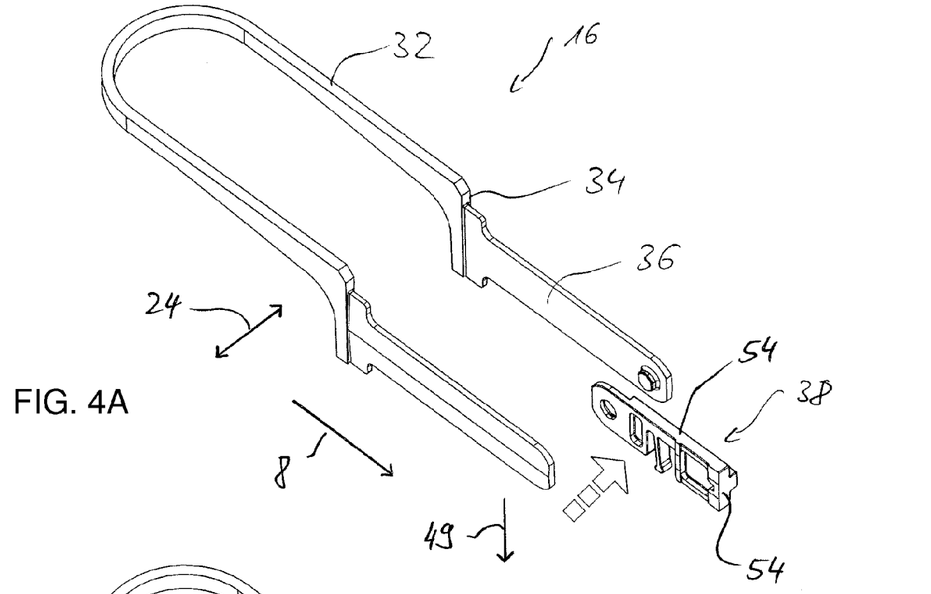
FIG. 4A is a perspective view of an actuating element with an unlocking element formed as a separate component prior to assembly.
Figure 4B:
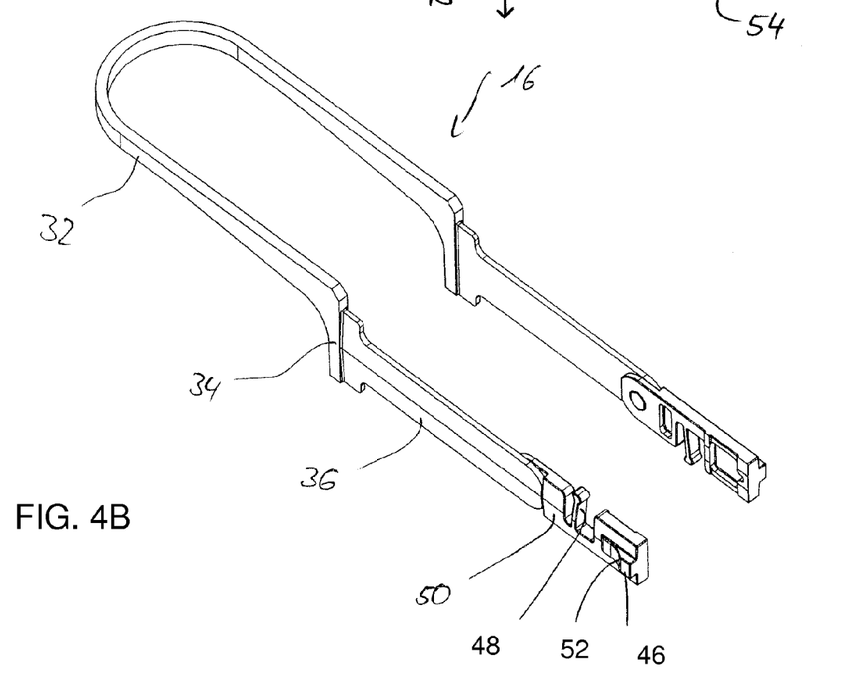

As can be seen well in FIG. 3, the two housing parts 10A, 10B are separated along a center line into two housing halves. They therefore respectively have guiding part-channels 28A, which complement one another in the assembled state to form the guide 28. They likewise respectively have clearance parts, which complement one another in the assembled state to form the clearance 20. At least with regard to these features, the two housing parts 10A, 10B are therefore formed symmetrically in relation to one another with respect to the center plane.

As can also be seen from FIG. 3, the clearance 20 has a continuation 42, extending in the longitudinal direction to form a step 40, so that the clearance 20 is formed altogether in an approximately T-shaped manner, i.e. the continuation 42 is preferably arranged centrally. In the region of the clearance 20, the guide 28 has on its base an additional recess, forming an abutment 44.

In a basic position, a locking release 46 of the unlocking element 38 engages in the continuation 42 and, furthermore, a spring tab 48 preferably engages in the abutment 44. The unlocking element 38 is for example formed altogether in the manner of a flat, plate-shaped component. Its height corresponds in this case substantially to the height of the respective fork arm 36, so that the end sides of the fork arms 36 are therefore in line with the end sides of the unlocking elements 38. On its rear side, the unlocking element 38 narrows to form a step and has in its rearward region a latching opening, in which there engages a respective latching pin that is formed on the fork arm 36. The unlocking element 38 respectively has an outer flat side and an inner flat side. Here, in the assembled state, the outer flat side is in line with the outer flat side of the respective fork arm 36. Integrally formed on this outer flat side 50 is the locking release 46, so, when considered in the transverse direction 24, it projects beyond the flat side 50. The locking release 46 is formed in the manner of a wedge, an outer (wedge) area 52 being concavely curved in the exemplary embodiment. Therefore, the locking release generally becomes thicker, in particular continuously, in the longitudinal direction 8 toward the counter piece 4.

To form the spring tab 48, the unlocking element 38 or the actuating element 16 has a recess or cutout, so that the spring tab 48 is elastically held by the unlocking element 38 merely at the bottom, and is otherwise movable within the free space that is formed. The spring tab 48 projects beyond an end side 54 in the vertical direction 49 and, in the exemplary embodiment, has a thickening there, which in the assembled state engages in the abutment 44. The entire unlocking mechanism is preferably formed by the described actuating element 16 and the specific configuration of the plug housing 10 with the clearance 20, and in addition preferably the guide 28. No further components are provided for the unlocking mechanism.

In the case of the unlocking elements 38, and overall also in the case of the actuating element 16, a principle of like parts is consistently applied, even for different applications. One example of this is that, both for the left fork side and for the right fork side, the unlocking elements 38 are formed identically and are attached to the respective fork arms 36 in an offset manner by being turned by 180°. As a result, differently formed unlocking elements 38 are not required.

Figure 1:
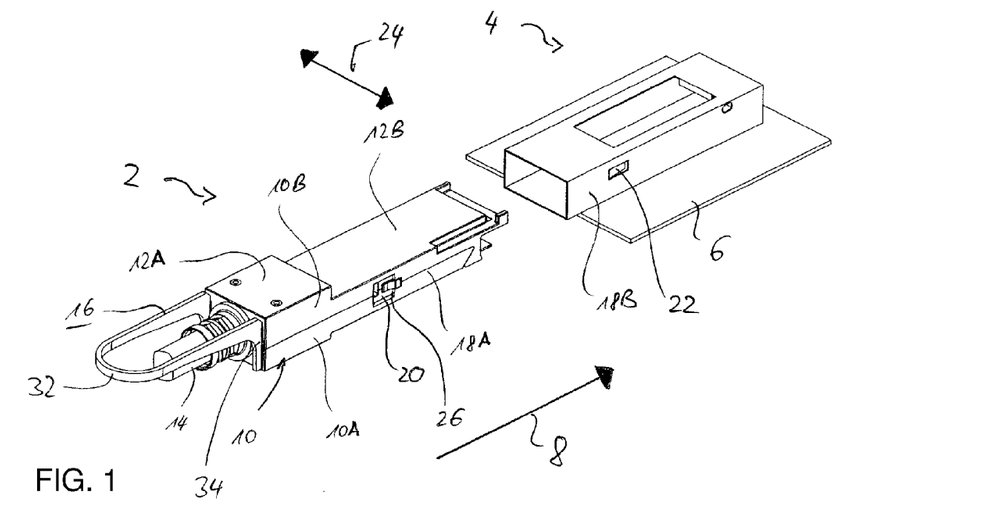
FIG. 1 is a diagrammatic, perspective view of a plug element with a cable connected to a rear side and a counter piece in an unplugged state according to the invention.
Figure 2:
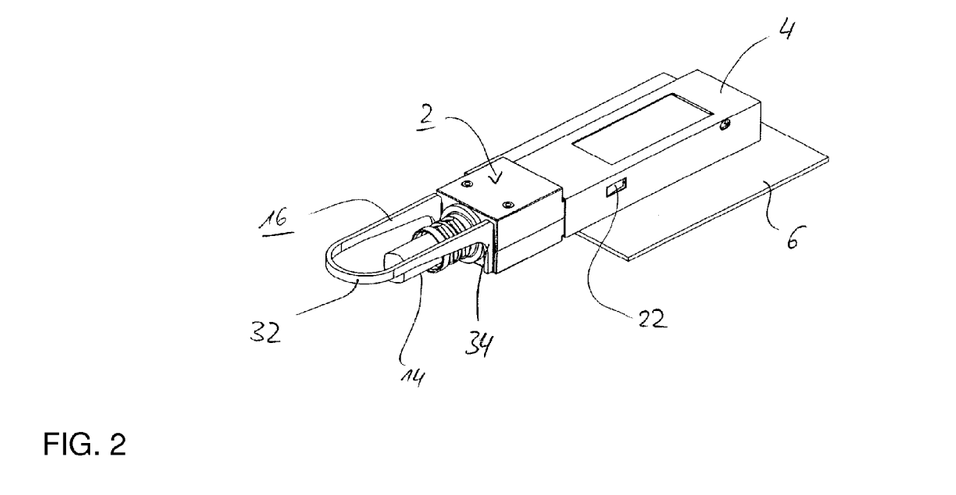
FIG. 2 is a perspective view of the elements shown in FIG. 1 in the interconnected state.

As a result of the specific configuration of the grip part with the L leg, the grip part 32 can optionally be positioned above or below the line 14. As can be seen in particular from FIGS. 1 and 2, the grip part is thereby at least almost in line with the upper side of the plug housing 10. Following this concept of like parts, attention must also be drawn especially to the mirror-inverted configuration of the two housing parts 10A, 10B, at least to the extent to which the guide 28 and the clearance 20 as well as the abutment 44 are concerned. The sum of these properties on the one hand requires only a small number of components for a wide variety of variants. On the other hand, assembly is easy, since it is independent of different variants.

In FIG. 3, connecting elements 56, formed as rivets, for connecting the two housing parts 10A, 10B are also additionally shown. Also shown are an outer sleeve 58 and an inner sleeve 60, through which the line 14 is inserted into the plug housing 10. The line 14 is preferably held in the sleeves 58, 60 by a crimped connection.

The operating mode of the unlocking mechanism is now explained more specifically on the basis of FIGS. 6A to 6D as well as 7A to 7D. In the basic position represented in FIGS. 6A to 6D, the two housings, to be specific the plug housing 10 and the housing of the counter piece 4, are locked with one another. As can be seen in particular from FIG. 6D, the inwardly bent locking tab 22 engages behind the edge 26, which is formed by a wall piece of the side wall 18A, bounding the clearance 20, of the plug housing 10. It can also be seen in FIG. 6D that the locking release 46 is positioned in front of the locking tab 22 when considered in the longitudinal direction 8 (that is to say in the direction of the counter piece 4). In the exemplary embodiment, the locking release 46 lies with its wedge area 52 against the front end side of the locking tab 22. Alternatively, in the basic position it may also be at some distance from it.

Figure 6A:
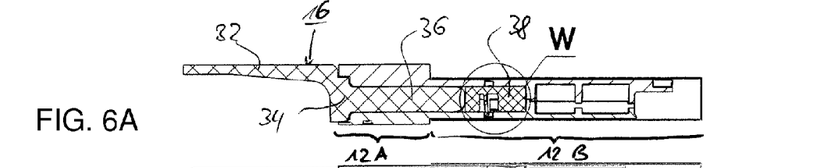
FIG. 6A is a sectional view through the plug housing along a longitudinal direction through the actuating element.
Figures 6B, 6C, 6D:
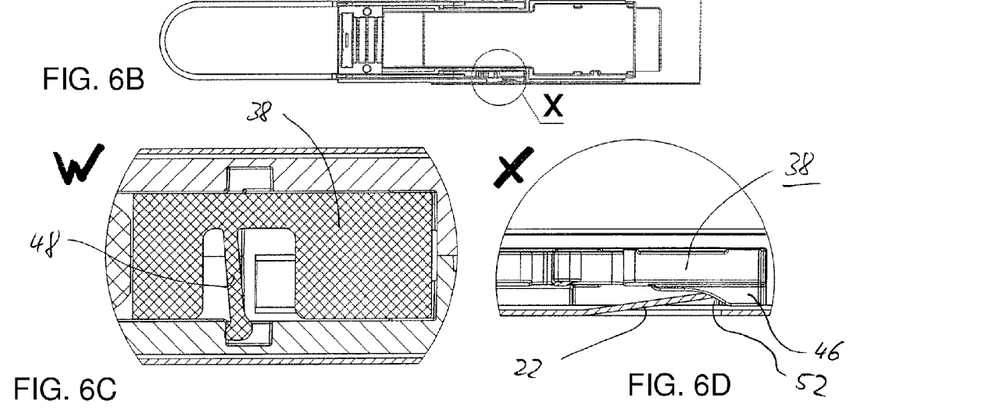
FIG. 6B is a plan view of the actuating element lying in a lower housing part.
FIG. 6C is an enlarged, sectional view of a detail W from FIG. 6A to illustrate the position of the unlocking element in the locked basic position.
FIG. 6D is an enlarged, sectional view of a detail X from FIG. 6B to illustrate the interaction between the locking tab and the edge as well as the locking release in the locked basic position.
Figure 7A:
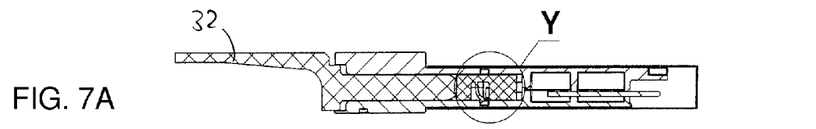
Figure 7B:
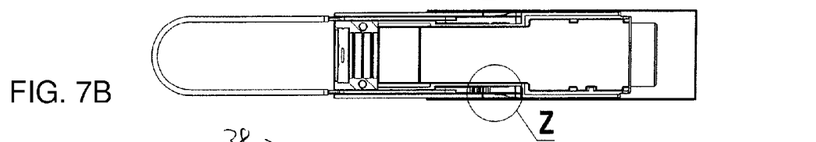
FIG. 7B is a plan view sectional view of the actuating element corresponding to FIG. 6B in the unlocked position.
Figure 7C:
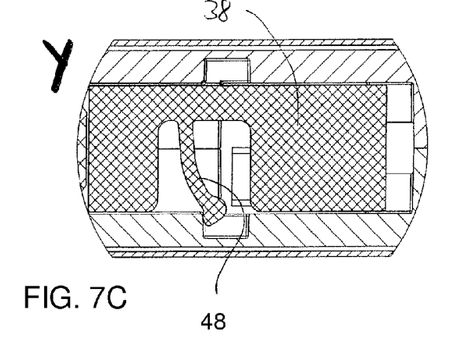
FIG. 7C is an enlarged, sectional view of the detail Y from FIG. 7A to illustrate the position of the unlocking element in the unlocked position and corresponding to FIG. 6C.
Figure 7D:
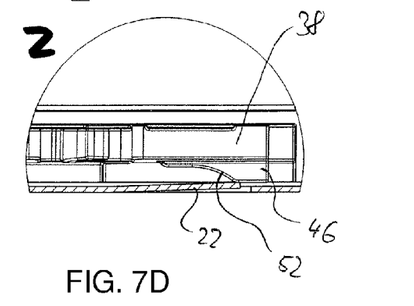
FIG. 7D is an enlarged, sectional view of the detail Z from FIG. 7B to illustrate the interaction between the locking tab and the edge as well as the locking release in the unlocked position and corresponding to FIG. 6D.

Furthermore—as can be seen from FIG. 6C—in the basic position the spring tab 48 engages in the abutment 44 and is supported on a wall of the abutment 44, so that the spring tab 48 is already somewhat prestressed. As a result, the spring tab 48 holds the unlocking element 38, and altogether the entire actuating element 16, in the basic position represented in FIGS. 6A to 6C. As can be seen in FIG. 6A, the grip part 32 lies with its L leg against the rear side of the plug housing 10.

Furthermore, the fork arm 36 extends at a mid-height with respect to the front insert region 12B. As can be seen from FIG. 6A, in the exemplary embodiment the rear region 12A of the plug housing 10 is not exactly symmetrical with respect to a center plane, but has a greater projection on the upper side. The L leg 34 has a double stepped formation, in such a way that first a T head that is formed approximately symmetrically with respect to the center plane is arranged in continuation of the fork arm 36, and then it is adjoined by the grip part 32. On account of the symmetrical form of the T head with respect to the center plane, the actuating element 16 can be optionally arranged with it turned by 180°.

Figure 5A:
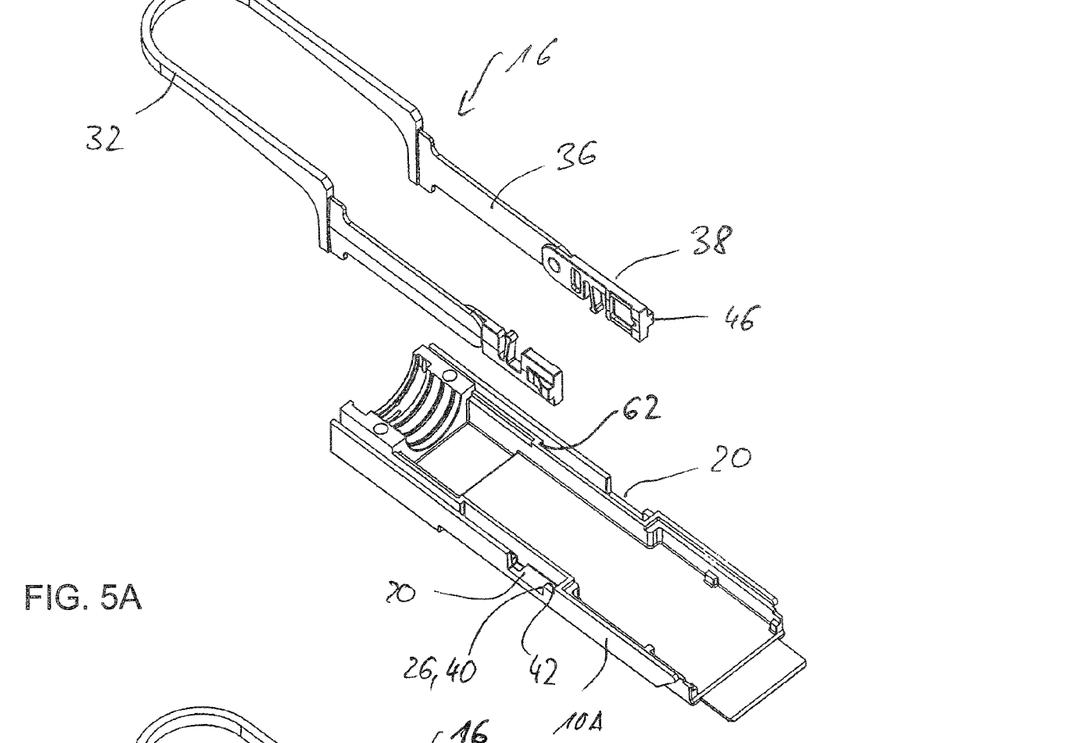
FIG. 5A is a perspective view of the actuating element represented in FIG. 4B together with a lower housing part before the insertion of the actuating element into the lower housing part.
Figure 5B:
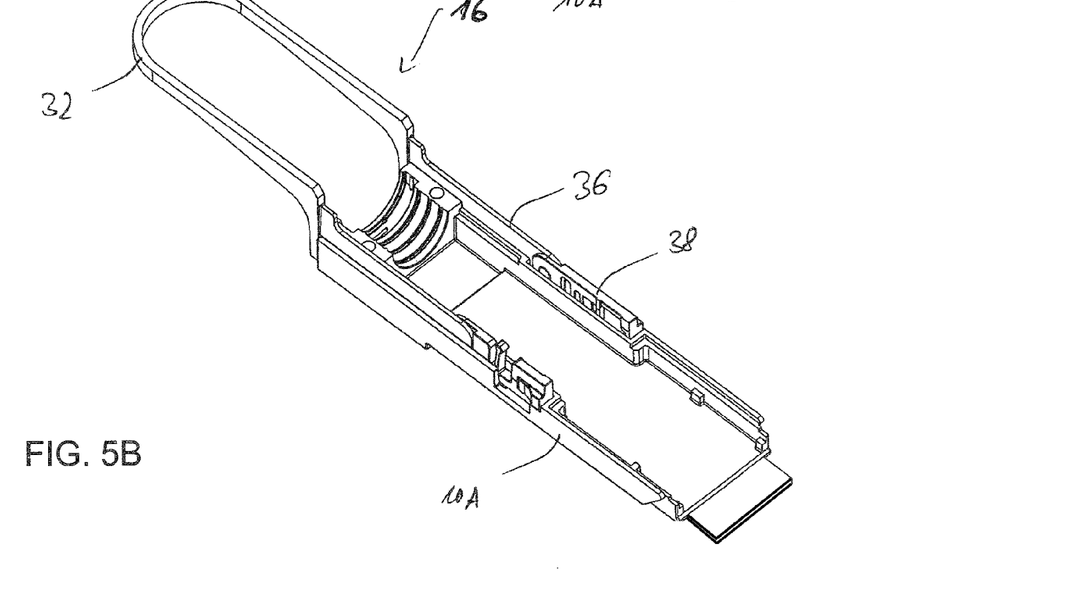
FIG. 5B is a perspective view of the components represented in FIG. 5A in the fitted-together state.

For unlocking, the grip part 32 is pulled manually rearward counter to the longitudinal direction 8. The rearward movement is limited in particular by a stop 62 in the guide 28 (see FIGS. 3, 5A, 5B). The unlocking element 38 is supported on the stop.

As can be seen from FIG. 6C—at the same time the spring tab 48 is noticeably stressed, so that the spring force, and consequently the restoring force, in the longitudinal direction 8 is therefore increased.

The actual unlocking takes place with the aid of the locking release 46, in that the latter presses the locking tab 22 outwardly in the transverse direction (FIG. 7D) by the wedge area 52 of the release interacting with the tab, so that the plug housing 10 can therefore be pulled out of the counter piece 4 in the rearward direction. Pressing out the locking tab 22 in the transverse direction has the effect of disengaging the form-locking engagement between the locking tab 22 and the edge 26.

Figure 8:
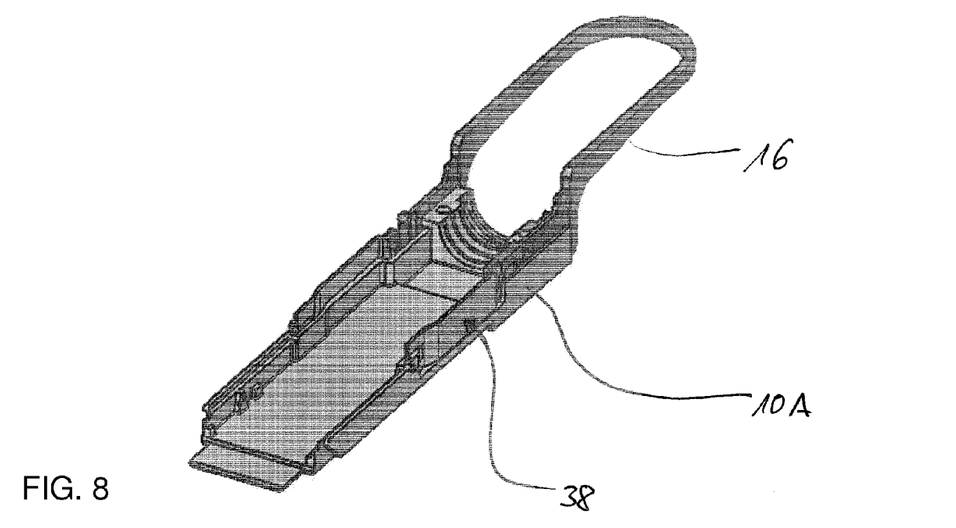
FIG. 8 is a perspective view of a second variant of the embodiment for the unlocking element similar to FIG. 5B.
Figures 9A, 9B:
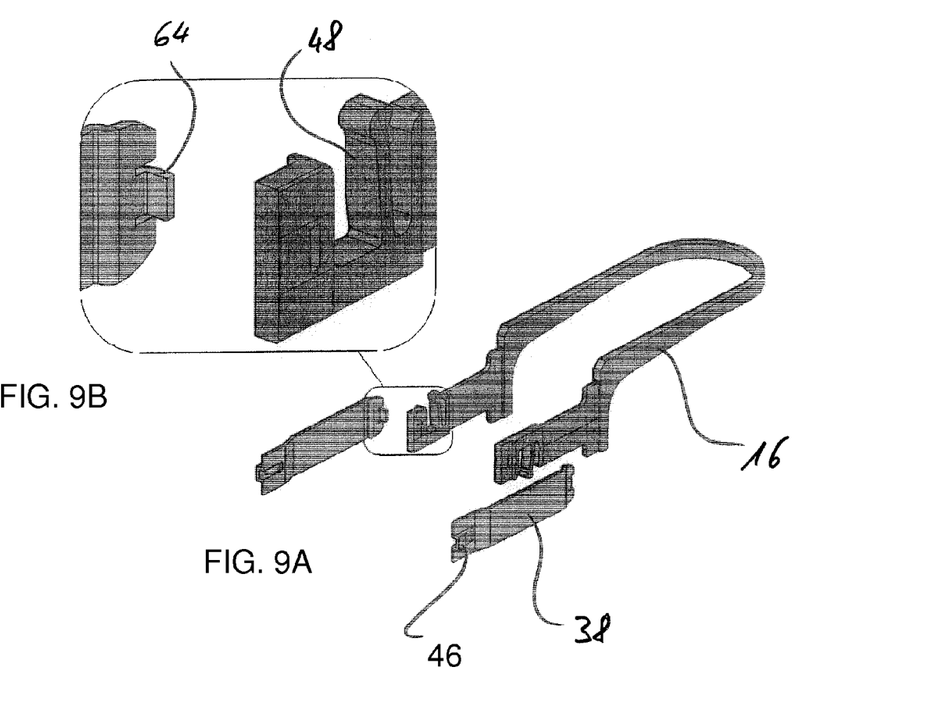
FIG. 9A is a perspective view of the actuating element with the unlocking element formed as a separate component, according to the second variant of the embodiment.
FIG. 9B is a perspective view of the region marked in FIG. 9A, enlarged as a cutout detail.

A second variant of the embodiment is explained on the basis of FIGS. 8, 9A and 9B. In the case of this variant of the embodiment, as a difference from that described with respect to FIGS. 1 to 7, it is provided that the spring tabs 48 are formed at the ends of the fork arms 36 of the actuating element 16. The specific structure and operating mode of the spring tabs 48 preferably correspond here to the configuration as provided in the case of the first variant of the embodiment. To this extent, in the case of the second variant of the embodiment the locking release 46 and the spring element 48 are formed on different components.

The unlocking element 38 is formed in particular as a thin metal sheet which is bent twice, so that it has an outwardly bent middle region. As can be seen in particular from FIG. 8, the middle region of the unlocking element 38 runs on the outer side of the plug housing 10, so that a widened interior is available. The unlocking element 38 has on its one end side the locking release 46. Its configuration and functioning mode are preferably at least largely identical to the first variant of the embodiment. The unlocking element 38 is connected by its opposite end with positive engagement to the actuating element 16 in the manner of a plug connection, as can be seen in particular from FIG. 9B. For this purpose, an insert lug 64 is bent around and can be reversibly inserted perpendicularly in relation to the longitudinal direction 8 into an assigned insert opening on the actuating element 16.

The invention claimed is:

1. A plug element having a locking mechanism for forming a lockable plug connection with a counter piece having a wall section with an elastic locking tab, the plug element comprising:
   a plug housing extending in a longitudinal direction and having a wall section and a clearance with an edge formed therein;
   an actuating element mounted displaceably in the longitudinal direction, for unlocking, said actuating element having a fork shape with two fork arms and a plate-shaped unlocking element disposed at an end side of each of said two fork arms, wherein in a plugged state, said wall section of said plug housing being in latching engagement with the wall section of the counter piece to form a locking, the locking occurring by the elastic locking tab engaging behind said edge of said clearance for forming the locking, said plate-shaped unlocking element formed such that, when said actuating element is displaced, the elastic locking tab is brought out of a locking position in a transverse direction, perpendicularly in relation to the longitudinal direction, at least one of said actuating element or said plate-shaped unlocking element having a recess formed therein; and
   a spring element for returning said actuating element into a basic position after actuation, said spring element being a spring tab formed in a manner of a lug being integrally formed elastically within said recess of said plate-shaped unlocking element or said recess of said actuating element, said spring tab extending in a vertical direction perpendicularly in relation to the longitudinal direction and the transverse direction and projecting beyond one of end sides of said plate-shaped unlocking element or said actuating element.

2. The plug element according to claim 1, wherein said plate-shaped unlocking element has on an outer side a locking release with an area which runs obliquely in relation to the longitudinal axis and, when said actuating element is displaced, said area interacts with the elastic locking tab, and the elastic locking tab is moved in the transverse direction for unlocking.

3. The plug element according to claim 1, further comprising a locking release, said clearance has in the longitudinal direction a continuation defining a step, in which said locking release lies in a basic position.

4. The plug element according to claim 1, wherein:
   said plug housing has an abutment formed thereon; and
   said spring element engages in said abutment formed on said plug housing.

5. The plug element according to claim 1, wherein said plate-shaped unlocking element is formed as a narrow plate-shaped element, which is led from said actuating element guided inside said plug housing to outside and runs along an outer side of said plug housing.

6. The plug element according to claim 1, wherein said plate-shaped unlocking element is made of an elastic material.

7. The plug element according to claim 1, wherein:
   said actuating element has a basic part; and said plate-shaped unlocking element is a separate component, which is connected to said basic part of said actuating element.

8. The plug element according to claim 1, wherein said plate-shaped unlocking element is one of two unlocking elements being formed identically and one of said unlocking elements disposed at each of said fork ends with said unlocking elements turned by 180° in relation to one another.

9. The plug element according to claim 1, wherein said actuating element has a grip part, which can be actuated from outside said plug housing, and is formed in such a way that said grip part can be disposed above or below a line leading into said plug housing, and said actuating element can be positioned on said plug housing with it turned by 180°.

10. The plug element according to claim 9, wherein said actuating element has two generally L-shaped legs, said grip part lies against said plug housing on the outside by means of said two L-shaped legs, and said two L-shaped legs are adjoined by said fork arms, which adjoin while extending into said plug housing along a center plane.

11. The plug element according to claim 10, wherein said grip part does not project beyond a cross-sectional contour defined by said plug housing.

12. The plug element according to claim 4, wherein said plug housing has two plug housing parts, which are separated along a center plane, and in that a guiding part-channel is provided in each of said plug housing parts, one guiding part-channel complementing the other to form a guide for said actuating element.

13. The plug element according to claim 12, wherein said guiding part-channels are formed symmetrically in relation to one another and each has as said abutment a cutout formed therein for said spring element, so that, depending on a fitted position, said spring element engages in said abutment being one of a lower abutment or an upper abutment.

14. The plug element according to claim 1, wherein said spring element is formed on one of said plate-shaped unlocking element or said actuating element.

15. The plug element according to claim 5, wherein said plate-shaped unlocking element is formed from metal.

16. The plug element according to claim 6, wherein said plate-shaped unlocking element is made from a material selected from the group consisting of plastic and metal.

17. The plug element according to claim 7, further comprising a latching engagement, said plate-shaped unlocking element is connected to said basic part of said actuating element by said by latching engagement.

18. The plug element according to claim 1, wherein the plug element is a QSFP plug element.

* * * * *